US008706577B2

(12) United States Patent
Stringfellow et al.

(10) Patent No.: US 8,706,577 B2
(45) Date of Patent: Apr. 22, 2014

(54) PAYMENT SYSTEM

(75) Inventors: Westley Stringfellow, London (GB);
Peter Winfield-Chislett, Reading (GB);
Itamar Lesuisse, London (GB);
Raymond Tamblyn, London (GB);
Verónica Casabonne, London (GB)

(73) Assignee: Visa Europe Limited, London (GB)

( * ) Notice: Subject to any disclaimer, the term of this patent is extended or adjusted under 35 U.S.C. 154(b) by 512 days.

(21) Appl. No.: 12/416,836

(22) Filed: Apr. 1, 2009

(65) Prior Publication Data
US 2010/0174626 A1 Jul. 8, 2010

(30) Foreign Application Priority Data
Jan. 6, 2009 (GB) .................................. 0900150.4

(51) Int. Cl.
G07B 17/00 (2006.01)
G06Q 40/00 (2012.01)
G06Q 20/00 (2012.01)
G06Q 40/02 (2012.01)
G06Q 20/10 (2012.01)
G06Q 20/20 (2012.01)

(52) U.S. Cl.
CPC ................ *G06Q 40/02* (2013.01); *G06Q 20/10* (2013.01); *G06Q 40/00* (2013.01); *G06Q 20/204* (2013.01)
USPC .................... 705/30; 705/39; 705/35; 705/17

(58) Field of Classification Search
None
See application file for complete search history.

(56) References Cited

U.S. PATENT DOCUMENTS

| 5,983,208 | A | * | 11/1999 | Haller et al. ................ 705/40 |
| 6,092,053 | A | * | 7/2000 | Boesch et al. ............... 705/26 |
| 6,609,113 | B1 | | 8/2003 | O'Leary et al. |
| 7,210,620 | B2 | | 5/2007 | Jones |
| 2001/0001321 | A1 | * | 5/2001 | Resnick et al. .............. 705/17 |
| 2002/0062281 | A1 | * | 5/2002 | Singhal ...................... 705/39 |

(Continued)

FOREIGN PATENT DOCUMENTS

EP  0501697 B1  4/1999
EP  0 987 642    3/2000

(Continued)

OTHER PUBLICATIONS

Search Report in PCT/EP2010/050079 dated Jan. 6, 2010.

(Continued)

*Primary Examiner* — Ryan Zeender
*Assistant Examiner* — Denisse Oritz Roman
(74) *Attorney, Agent, or Firm* — EIP US LLP

(57) ABSTRACT

Embodiments of the invention provide a method of processing payment authorization requests for payment transactions to be conducted via a data communications network on behalf of online merchants. The payment authorization requests are conducted as a result of orders by financial instrument holders via a plurality of different online merchant systems, each of said online merchants having an online merchant identity. The method is conducted by a trusted central intermediary system which is configured to transmit payment authorization requests to each of a plurality of different online merchant Internet Payment Service Provider (IPSP) systems. In some embodiments, a user may select a payment method on a per transaction basis, while removing the requirement for the user to provide payment details to individual online merchant systems or to their merchant IPSP systems by having the user submit their respective payment details to a separate, trusted entity.

20 Claims, 5 Drawing Sheets

(56) References Cited

U.S. PATENT DOCUMENTS

| | | |
|---|---|---|
| 2002/0077837 A1 | 6/2002 | Krueger et al. |
| 2002/0178115 A1* | 11/2002 | Seo .................................. 705/39 |
| 2003/0055781 A1 | 3/2003 | Ong |
| 2004/0107146 A1 | 6/2004 | Alfano |
| 2005/0015304 A1 | 1/2005 | Evroni et al. |
| 2005/0021401 A1* | 1/2005 | Postrel ............................ 705/14 |
| 2005/0234833 A1 | 10/2005 | VanFleet et al. |
| 2006/0064376 A1 | 3/2006 | Ukigawa et al. |
| 2006/0287965 A1 | 12/2006 | Bajan |
| 2007/0250441 A1* | 10/2007 | Paulsen et al. .................. 705/39 |
| 2008/0040237 A1 | 2/2008 | Crussol et al. |
| 2008/0059367 A1 | 3/2008 | Anuszewski et al. |
| 2008/0103972 A1 | 5/2008 | Lanc |
| 2009/0259574 A1 | 10/2009 | Thomsen et al. |
| 2010/0106611 A1* | 4/2010 | Paulsen et al. .................. 705/26 |

FOREIGN PATENT DOCUMENTS

| | | |
|---|---|---|
| EP | 1077436 A2 | 2/2001 |
| EP | 1178451 A2 | 7/2001 |
| EP | 0745961 B1 | 11/2001 |
| EP | 0901672 B1 | 11/2003 |
| EP | 1609104 | 10/2004 |
| EP | 1510984 A2 | 3/2005 |
| EP | 1107198 B1 | 1/2007 |
| EP | 1379045 B1 | 10/2007 |
| EP | 1887506 A1 | 2/2008 |
| EP | 1497947 B1 | 6/2009 |
| GB | 2360380 | 9/2001 |
| GB | 2397731 B | 2/2006 |
| GB | 2436043 B | 9/2009 |
| WO | WO 00/33219 | 6/2000 |
| WO | WO 00/67216 | 11/2000 |
| WO | WO 00/67219 | 11/2000 |
| WO | WO 01/43033 A1 | 6/2001 |
| WO | WO 01/59630 A1 | 8/2001 |
| WO | WO 01/82246 A2 | 11/2001 |
| WO | WO 02/01447 A1 | 1/2002 |
| WO | WO 02/05231 | 1/2002 |
| WO | WO 02/25495 A1 | 3/2002 |
| WO | WO 02/46976 A1 | 6/2002 |
| WO | WO 03/088078 A2 | 10/2003 |
| WO | WO 2004/012036 | 2/2004 |
| WO | WO 2004/086190 A2 | 10/2004 |
| WO | WO 2004/090819 A2 | 10/2004 |
| WO | WO 2004/114168 A1 | 12/2004 |
| WO | WO 2005/048032 A2 | 5/2005 |
| WO | WO 2005/107135 A1 | 11/2005 |
| WO | WO 2006/083825 A2 | 8/2006 |
| WO | WO 2007/125316 | 11/2007 |
| WO | WO 2008/016567 | 2/2008 |
| WO | WO 2008/089263 A2 | 7/2008 |
| WO | WO 2008/098163 A2 | 8/2008 |
| WO | WO 2008/106498 A1 | 9/2008 |
| WO | WO 2008/119168 A1 | 10/2008 |
| WO | WO 2008/127431 A2 | 10/2008 |
| WO | WO 2008/131021 A1 | 10/2008 |
| WO | WO 2009/002972 A2 | 12/2008 |
| WO | WO 2009/003030 A2 | 12/2008 |
| WO | WO 2009/011992 A1 | 1/2009 |
| WO | WO 2009/015222 A2 | 1/2009 |

OTHER PUBLICATIONS

Search Report in GB0900150.4 dated Apr. 27, 2009.
Amended Search Report in GB0900150.4 dated May 20, 2009.
Qin Ylng et al. "Some thoughts on the Development of Electronic Payment Security Protocol"; Economic & Trade Update, Jul. 31, 2008 vol. 6 No. 108, pp. 1 and 2.

* cited by examiner

PAYMENT SYSTEM

CROSS-REFERENCE TO RELATED APPLICATIONS

This application claims priority under 35 U.S.C. §119(a) to Great Britain application no. GB 0900150.4, filed Jan. 6, 2009, the entire disclosure of which is incorporated by reference herein.

BACKGROUND OF THE INVENTION

1. Field of the Invention

The present invention relates to a system and method of processing payment authorization requests for payment transactions to be conducted via a data communications network on behalf of online merchants, and is particularly, but not exclusively, suited to the processing of orders placed by financial instrument holders.

2. Description of the Related Technology

Users are increasingly encouraged to purchase goods online, i.e. via the Internet and associated technologies. Generally speaking, existing online payment systems fall into one of three types of arrangements: in a first type of arrangement, an online merchant system collects payment details from a financial instrument holder, otherwise known as a buyer or cardholder, without the buyer dealing directly with any other entity that may be involved in the transaction, and the online merchant system sends the transaction details directly to their acquiring bank system. In a second type of arrangement, the online merchant system collects payment details from a buyer without the buyer dealing directly with any other entity that may be involved in the transaction, and the online merchant system sends the transaction details to an online merchant Internet Payment Service Provider (IPSP) which processes payment authorizations on behalf of the merchant. The merchant IPSP system subsequently transmits the details to the online merchant's acquiring bank system; the details may be transmitted directly to the acquiring bank or to a payment processor which acts on behalf of the acquiring bank. Examples of IPSP systems which provide support for this second type of arrangement include the Protx™ Veri-Secure Payment system (VSP).

In an arrangement of the first and second type, the online merchant system typically obtains payment card data, bank account information and/or other financial data from the buyer. The online merchant system then passes this information either directly, or via a merchant IPSP system, to an acquiring bank processing system. Each online merchant system is assigned an online merchant account identifier by an acquiring bank, and this account identifier is used to identify the online merchant to the acquiring bank when requesting authorization of a transaction.

FIG. 1 shows an example of conventional online payment systems according to arrangements of the second type, comprising a plurality of online merchant systems 1a, 1b, 1c. In this arrangement each of the online merchants is in operative association with an online merchant Internet Payment Service Provider (IPSP) system 3, which is a payment gateway selected and subscribed to by the online merchant for the purposes of conducting secure business on the Internet. While the figure shows each of the online merchant systems 1a ... 1c being associated with the same merchant IPSP system 3, alternatively, and in fact often in practice, online merchant systems are linked to different merchant IPSP systems 3. Each merchant IPSP system 3 provides a system that passes payment card data, authorization requests, and authorization responses over the Internet using encryption technology. The transaction information is sent by the merchant IPSP system 3, via a data communications link, to the acquiring bank 5, and thence to the card scheme system 7 which intermediates with an issuing bank where the validity of the card is checked and the availability of funds on that account is verified. An authorization code is returned to the merchant IPSP system 3; the authorization is encrypted by the merchant IPSP system 3 and transmitted in encrypted form to the online merchant system 1a, which triggers fulfillment of the order.

A conventional end-to-end online transaction using an arrangement of the second type and involving the entities shown in FIG. 1 comprises the following steps:

An online merchant's system 1a website collects from a buyer one or more order selections. The buyer checks out, enters their payment details and places an order on the online merchant's system 1a website by pressing the 'Submit Order' or equivalent button on the merchant website's order transmission webpage. The buyer's web browser encrypts the information to be sent between the browser and the online merchant's web server. The online merchant then forwards the transaction details to their merchant IPSP system 3, typically via another encrypted connection to the payment server hosted by the merchant IPSP system 3. The merchant IPSP system 3 forwards the transaction information, including the online merchant's internet account identifier, to the processor used by the online merchant's acquiring bank system 5. The processor 5 forwards the transaction information to the payment scheme system 7 (e.g. Visa/MasterCard). The payment scheme system 7 routes the transaction to the correct card issuing bank system 9.

The payment card issuing bank system 9 receives the authorization request and sends a response back to the processor of the online merchant's acquiring bank system 5 with a response code. The processor of the online merchant's acquiring bank system 5 forwards the response to the merchant IPSP system 3. The merchant IPSP system 3 receives the response, and forwards it on to the online merchant's system where it is interpreted and a relevant response then relayed back, via the merchant to the buyer confirming that the transaction has been authorized. The merchant IPSP system 3, on behalf of the online merchant, submits all their approved authorizations to the online merchant's acquiring bank system 5 for settlement. The acquiring bank system 5 deposits the total of the approved funds minus any fees and charges in to the online merchant's nominated account. This could be an account with the acquiring bank if the online merchant does their banking with the same bank, or an account with another bank.

An advantage of using a payment gateway such as the merchant IPSP system shown in FIG. 1 is that the merchant IPSP system can provide one or more additional various transaction processing functions, for example settlement, handling of chargebacks, handling of refunds, and transaction reporting, on behalf of the online merchant. In the settlement procedure, the merchant IPSP system 3 submits all the online merchant's approved authorizations collected over a given period, in a "batch", to the online merchant's acquiring bank system 5 for settlement. A chargeback is a reversal of a payment card transaction initiated by the buyer or the bank that issued the card used in the purchase. This differs from a refund, which is agreed to and initiated by the online merchant, via the merchant IPSP system 3. Transaction reporting involves providing an overview reporting function for accumulated transactions which have been authorized and optionally settled via the merchant IPSP system 3, so that a merchant can for example select a date range and see an overview relating to all transactions conducted within the selected date range. A merchant IPSP system 3 may provide an online merchant with a secure online website whereby to approve chargebacks, initiate refunds and/or view transaction reports as described.

However, in each of the first and second types of payment systems described above, a buyer is required to provide his or her payment information separately for transactions initiated with each different online merchant. Thus, for each new online merchant that a buyer interacts with, the risk of exposure, misappropriation and/or fraudulent use of the buyer's financial data increases.

In a third type of arrangement (not shown) the online merchant system redirects the buyer to an alternative payment system website with which the buyer interacts in order to complete the transaction. The alternative payment system interacts directly with the user who provides payment to the alternative payment system either directly from their bank account or via a mechanism such as a payment card. Where a payment card from a conventional payment scheme is used the alternative payment system performs the role of the merchant in the conventional payment system, submitting a payment demand through an acquiring system. Payment from the user is made to the alternative payment system. The alternative payment system is then responsible for any reimbursement of the merchant. In a second case, the alternative payment system can, in effect, behave as a conventional clearing house, funding a user's account within the alternative payment system from the user's actual issuing bank account by directly debiting their account. The alternative payment system subsequently ensures payment is sent to the merchant's issuing bank account, usually through a conventional clearing house. This merchant bank account may or may not be the same as their account held with their conventional acquiring system. Thus most of the time payment systems of the third type act as the intermediary to take actual funds from the user and pass them to the merchant, most usually via the consumer's and merchant's individual bank accounts, potentially holding on to those funds as they pass through accounts held by the payment system; an example of this third type of payment system includes the well known PayPal™ payment system. Such a payment system may also have the capability to operate as a conventional IPSP, for example by providing associated online payment handling services.

While this type of payment system relieves the need for the user to set up individual payment accounts on a per online merchant basis, the user has a relationship with the alternative payment system and not with the online merchant system; this gives rise to several notable disadvantages: firstly the online merchant neither receives payment directly from an acquiring bank nor can avail itself of a payment-scheme based guarantee of payment, because for these transactions there is no direct relationship between the merchant and a card payment scheme. Secondly, for transactions effected via card payment the buyer does not have visibility of the individual online merchant from whom the product was bought (instead the card statement identifies the alternative payment system entity). Thirdly, the buyer is not protected by the card scheme's rules and may not be protected by any applicable consumer protection, because the transaction is with the payment system, and not with the online merchant system.

SUMMARY OF CERTAIN INVENTIVE ASPECTS

In accordance with at least one embodiment of the invention, systems and software are provided for processing payment authorization requests for payment transactions to be conducted via a data communications network on behalf of online merchants, as specified in the independent claims. This is achieved by a combination of features recited in each independent claim. Accordingly, dependent claims prescribe further detailed implementations of the present invention.

More particularly, aspects of the invention provide a method of processing payment authorization requests for payment transactions to be conducted via a data communications network on behalf of online merchants, the payment authorization requests being conducted as a result of orders by financial instrument holders via a plurality of different online merchant systems, each of the online merchants having an online merchant identity, and each of the online merchants being associated with one of a plurality of different acquiring banks, wherein the method is conducted by a trusted central intermediary system which is configured to transmit payment authorization requests to each of a plurality of different online merchant Internet Payment Service Provider (IPSP) systems, each of the merchant IPSP systems being configured to transmit payment authorization requests to at least one of a plurality of acquiring bank payment processor systems, each of the plurality of acquiring bank payment processor systems being responsible for processing payment authorizations for at least one of the acquiring banks, the method comprising:

receiving from a first online merchant system, responsible for originating payment authorization requests for a first online merchant, a payment authorization request relating to authorization of a payment transaction, the received payment authorization request being initiated as a result of a financial instrument holder conducting an order via the first online merchant system;

in response to receiving the request:

a) generating a payment authorization request comprising transaction data including:

i) a financial instrument identity to be used in the payment transaction by the financial instrument holder; and ii) an online merchant identity, associated with the first online merchant, as the payment transaction beneficiary; and iii) one or more transaction details including a payment amount; and b) retrieving transmission data to enable the transmission of payment authorization request data to a selected merchant IPSP system associated with the first online merchant; and on the basis of the retrieved transmission data, transmitting the generated payment authorization request to the selected merchant IPSP system, wherefrom a further payment authorization request may be generated and transmitted to an acquiring bank payment processor system responsible for processing payment authorizations for the acquiring bank with which the first online merchant is associated.

Thus embodiments of the invention enable a user to select a payment method on a per transaction basis, while removing the requirement for the user to provide payment details to individual online merchant systems or to their merchant IPSP systems. Thus, providing that online merchants, or their merchant IPSPs, subscribe to a service configured to perform the method, users only have to submit their respective payment details, preferably only once, to a separate, trusted entity. This has the benefit of reducing the risk of fraud that may be incurred in relation to conventional arrangements of payment systems, while allowing users to effect transactions more quickly and conveniently because there is no need for the user to input personal and financial information in respect of each transaction. Further, since the method can be implemented by an entity interfacing with, rather than replacing, an online merchant's existing IPSP system, it is the online merchant's account identifier that is transmitted to the acquiring bank. Thus the relationship for such transactions is between the buyer and the online merchant, with the resulting benefit that the buyer is protected by the card scheme's rules and, in some eventualities, compliance with any applicable consumer protection. In addition, the merchant IPSP system can provide one or more additional various transaction processing functions, for example settlement, handling of chargeback, handling of refunds, and transaction reporting, on behalf of the online merchant system. In particular the merchant IPSP system may provide an online merchant with a secure online website whereby to approve chargebacks, initiate refunds and/or view transaction reports relating to transactions authorized through the system of the present invention.

Because the transactions which are authorized using the system of the present invention are still processed by the merchant IPSP system, merchant IPSP functions relating to these transactions may be accessed by the online merchant using an interface common to different transaction types. These transaction types may include both transaction types for which payment authorization requests are originated via the trusted intermediary system and other, separately authorized, transaction types which may be processed by the IPSP on behalf of the merchant without passing via the trusted intermediary system. This common interface may comprise a secure online website as mentioned above.

Further features and advantages of the invention will become apparent from the following description of certain embodiments of the invention, given by way of example only, which is made with reference to the accompanying drawings.

DETAILED DESCRIPTION OF CERTAIN INVENTIVE EMBODIMENTS

As described above, embodiments of the invention are concerned with a payment system and method, specifically a system and method of processing payment authorisation requests for payment transactions to be conducted via a data communications network on behalf of online merchants. The system involves a novel transactional entity, herein referred to as a trusted intermediary system, which cooperates with the conventional payment entities described in the background section with reference to FIG. 1.

Figure 2:
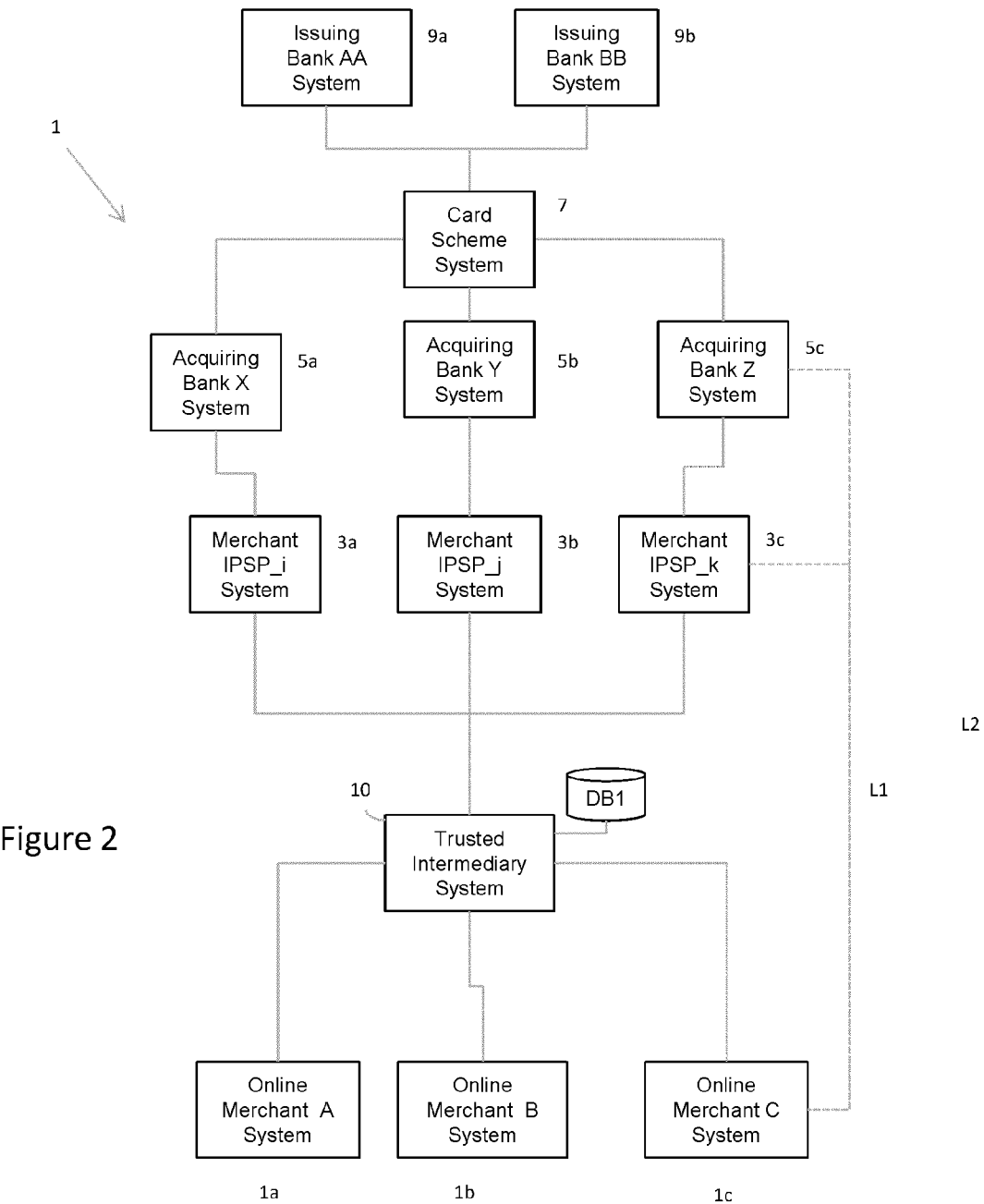
FIG. 2 is a schematic diagram showing a payment system according to an embodiment of the invention.

FIG. 2 depicts a schematic illustration of a payment system 1 according to an embodiment of the invention. The trusted intermediary system 10 is shown as transmitting payment authorisation requests to each of a plurality of different merchant IPSP systems 3a . . . 3c. Each of the online merchant processing systems 1a . . . 1c is associated with one of the merchant IPSP systems 3a . . . 3c as indicated by the dotted line L1 for one of the online merchants 1c, as well as being associated with one of the acquiring banks 5c, as indicated by the dotted line L2, again for online merchant 1c. At least some of the merchant IPSP systems 3b, 3c can be arranged to transmit payment authorisation requests to more than one acquiring bank: this reflects the fact that more than one online merchant may process their payments via a given merchant IPSP system, but each has an account with a different acquiring bank.

Further, each online merchant system 1a . . . 1c website's order transmission webpage includes, as a novel payment option, referred to herein as "Secure System of Payment" (SSP), this identifying payment via the trusted intermediary system 10. Other payment options, including conventional online payment options, may also be included whereby a buyer can select a payment option which does not involve payment authorisation being processed through the trusted intermediary system 10. Such separately authorised transactions may for example include conventional online payment options in which a buyer enters their payment details into the online merchant system 1c directly, or the merchant IPSP system 1c directly, rather than using the trusted intermediary system 10. These separately authorised transactions are, however, preferably processed via the merchant IPSP system 1c.

The trusted intermediary system 10 holds data in a database DB1 corresponding to users (buyers) and online merchants that have registered with the intermediary 10, together with transaction data. As will be described in more detail below, the database DB1 holds a set of payment details for the user in the form of a stored set of records conveniently referred to as a remote store; users can add details of payment instruments (typically cards and accounts) from which they can select to make payment for a transaction, causing the trusted intermediary system to update the contents of the user's remote store. This enables the user to select a payment method on a per transaction basis, while removing the requirement for the user to provide payment details to individual online merchants each time they shop online. Thus, provided online merchants subscribe to the trusted intermediary system 10, users only have to submit their respective payment details once, to a single entity. This has the benefit of reducing the risk of fraud that may be incurred in relation to conventional arrangements of payment systems (such as that shown in FIG. 1).

The trusted intermediary system 10 interfaces with, rather than replaces, the online merchant IPSP system 3c, which may be the online merchant's existing merchant IPSP system when subscribing to the service provided by the trusted intermediary system 10.

Because transaction authorisation requests which are originated using the trusted intermediary system 10 are passed to and processed by the IPSP system 3c, additional various transaction processing IPSP functions relating to these transactions may be accessed by the online merchant. The merchant IPSP system 3c can provide one or more such additional transaction processing functions, for example settlement, handling of chargeback, handling of refunds, and transaction reporting, on behalf of the online merchant system 1c. The merchant IPSP system 3c preferably provides the online merchant with a secure online website whereby to approve chargebacks, initiate refunds and/or view transaction reports relating to transactions authorised through the trusted intermediary system 10.

Further, because transaction authorisation requests which are originated using the trusted intermediary system 10 are passed to and processed by the IPSP system 3c, IPSP functions relating to these transactions may be accessed by the online merchant using an IPSP system interface which is common to different transaction types, including both transaction types authorised via the trusted intermediary system 10 and other, separately authorised, transaction types which may be processed by the IPSP on behalf of the merchant without passing via the trusted intermediary system 10. Such separately authorised transactions may for example include transactions for which a buyer enters their payment details into the online merchant system 1c directly, or the merchant IPSP system 3c directly, for use in payment authorisations conducted by the merchant IPSP system 1c.

Further, it is the online merchant internet account identifier that is transmitted to the acquiring bank 5c by the merchant IPSP system 3c as part of the payment authorisation request. This has the benefit of ensuring the buyer is protected by the card scheme's rules and, in some eventualities, compliance with any applicable consumer protection, and identifies each transaction on a per online merchant basis on the user's card statements.

Figure 1:
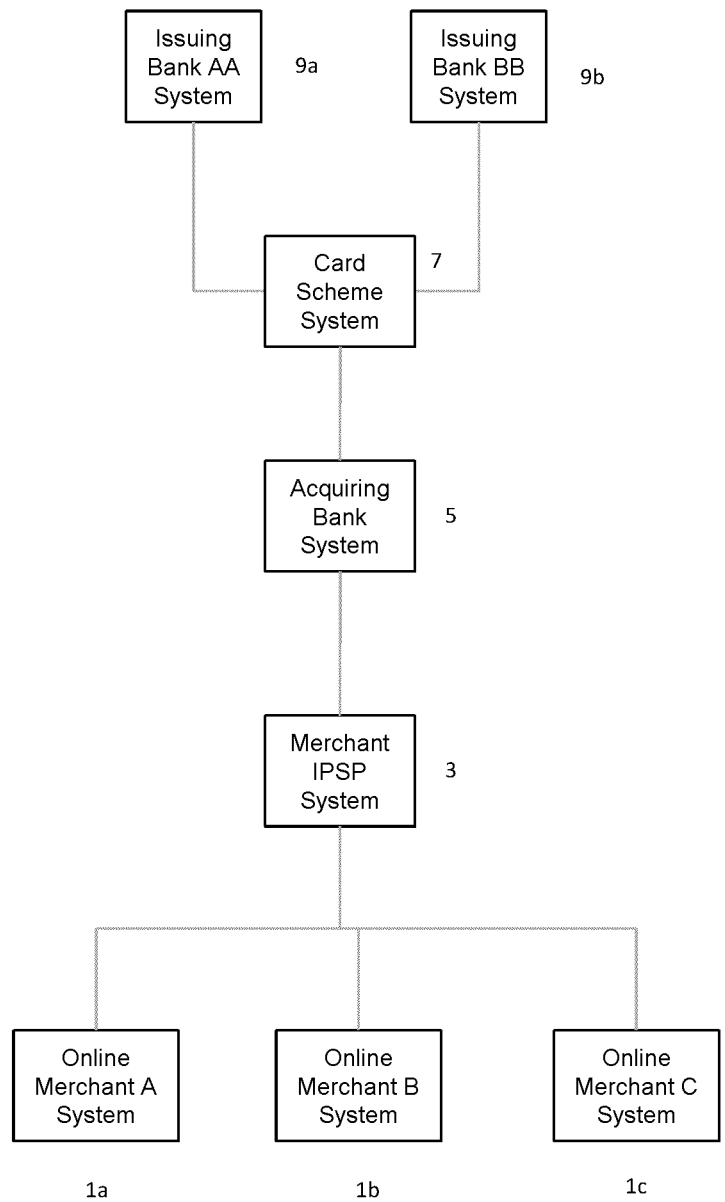
FIG. 1 is a schematic diagram showing a conventional payment system.

In addition, because payment systems according to embodiments of the invention involve the addition of the trusted intermediary system 10 within an existing and known set of processing entities, payments can be made according to conventional methods using the second and third types of arrangement described with reference to FIG. 1 in addition, or as an alternative to, via the trusted intermediary system 10.

Figure 3:
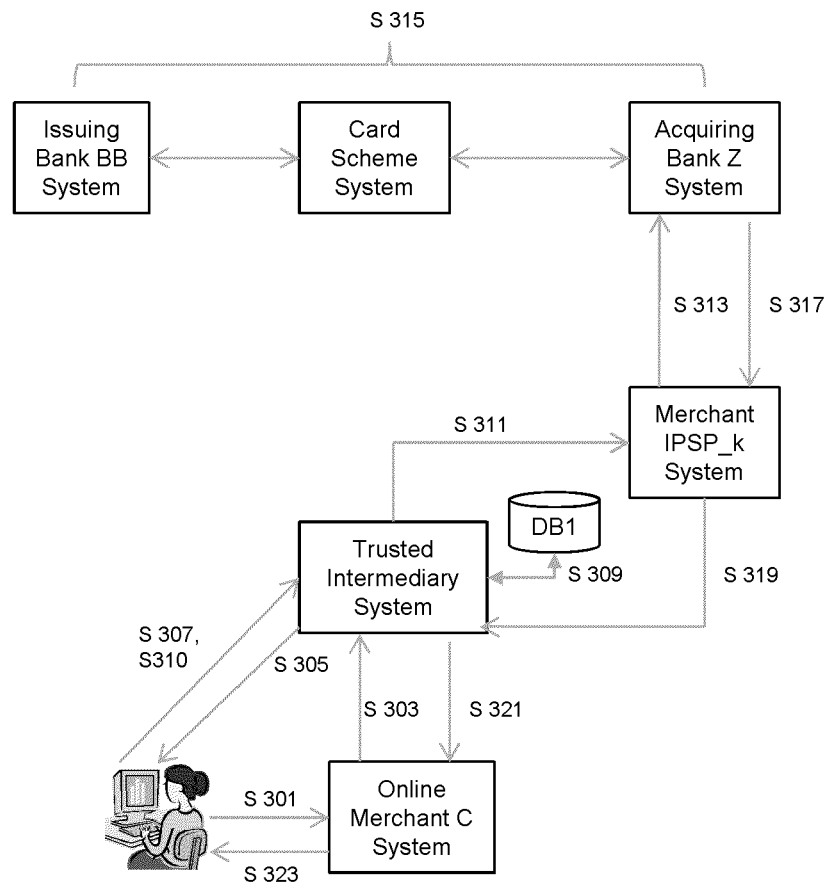
FIG. 3 is a schematic flow diagram showing the flow of data during use of the payment system of FIG. 2 according to an embodiment of the invention.

Referring now to FIG. 3, operation of the payment system 1 according to an embodiment of the invention will now be described. At step S301 the user completes their shopping experience with online merchant C's online merchant system, initiates checkout using the online merchant system, and proceeds to the virtual checkout, according to conventional methods available through commonly available shopping cart and check-out software packages such as are known to the skilled person. The user selects "Secure System for Payment" (SSP) as a payment option (step S301), causing the online merchant system 1c to transmit an originating payment authorisation request message to the trusted intermediary system 10 (step S303); the originating request message comprises at least an amount of payment for the selected goods, the online merchant account identifier and an identifier for the order. The trusted intermediary system 10 then transmits a login URL to the user (step S305), prompting the user to login, or, if this is their first time of selecting SSP as a payment option, to register with the trusted intermediary system 10. Assuming for the purposes of this example that the user has previously registered with the service, the user inputs their login credentials (e.g. username, password, or other authentication details, dependent on the authentication mechanism utilised by the trusted intermediary system 10-step S307).

The trusted intermediary system 10 then performs a lookup based on the user's credentials and identification details (step S309), retrieving details from the user's remote store from the database DB1, and presenting same to the user for their selection of payment method (step S310). Upon selection of the desired payment method from options provided according to the details retrieved from user's remote store the trusted intermediary system 10 sends a payment authorisation request message to the online merchant's IPSP system 3c, the payment authorisation request message comprising the selected payment instrument details, the amount of payment required and the online merchant identifier (step S311). The merchant IPSP system 3c sends a further payment authorisation request to the relevant acquiring bank 5c (step S313), prompting authorisation (or otherwise) per conventional methods (step S315) and the transmission of a response message from the acquiring bank 5c to the merchant IPSP system 3c (step S317). Assuming the response to comprise confirmation of the payment having been authorised, at step S319, the merchant IPSP system 3c sends a payment success notification message to the trusted intermediary system 10. This payment success notification message comprises a reference for the card scheme authorisation and a transaction identifier for the card scheme transaction.

Thereafter the trusted intermediary system 10 sends a payment success confirmation message to the online merchant system 1c (step S321), which prompts the online merchant system to confirm the order status to the user (step S323).

It will be appreciated from the foregoing that conventional online merchant systems (including their merchant IPSP system) require modifying to include "Secure System for Payment" (SSP) as a payment option and indeed to interface with the trusted intermediary system 10. Accordingly the merchant IPSP system exposes a payment authorisation service to the trusted intermediary system 10 that allows payment & settlement for payment instruments (typically cards and bank accounts). Further it will be appreciated that because the trusted intermediary system 10 integrates with many merchant IPSP systems, it thus comprises a plurality of interface formats and protocols, each corresponding to a respective merchant IPSP system. Further, each online merchant's system is configured with integration software components, e.g. in the form of plug-ins, which enables the online merchant to integrate with the trusted intermediary system 10 for the purpose of initiating a payment transaction using SSP as a payment method.

Details of the configuration and processing capabilities of the trusted intermediary system 10 will now be described with reference to FIG. 4. The trusted intermediary system 10 comprises presentation and connectivity processing components, which are configured to transmit and manage various user-specific and online merchant-specific data; these processing components will be explained in more detail below, but in overview they comprise the following:

User Registration Components and Data

When a user wishes to register with the trusted intermediary system 10, they are required to complete an account registration process that allows a user to create an account with the SSP service. The account is required to be populated with appropriate data that can be used to make payments from the SSP service from an online merchant system offering the service.

Registration of the user with the trusted intermediary system 10 can be performed via any suitable interface, most conveniently, when the trusted intermediary system 10 is implemented as a web server, via a web browser. Once registered, and as mentioned above each user has a set of records associated therewith, which stores details of the accounts which they wish to debit when effecting a financial transaction. This could be a bank account, a payment card or other account such as any payment instrument that can be given a unique account reference. The trusted intermediary system 10 comprises presentation components 404 that enable the user to select and add to/remove from the list of payment instruments. In addition the user has address book entries, which hold shipping details; the presentation components 404 enable the user to modify the shipping details. Each user has a profile, which comprises demographic and identification data for the user and can be modified via the presentation components 404, while user transaction data can be displayed for review by the user. As shown in FIG. 4 and explained in more detail below, the trusted intermediary system 10 can be implemented as a web server, in which case the presentation component 404 interoperate with the user's browser to allow selection and modification of the user data in the manner just described.

Registration can be effected via a number of channels:

Register via SSP site—the user logs onto the website of the trusted intermediary system 10 and is presented with a registration page designed to capture the user's identity and preferred payment instrument details Re-direct from order system—If the user is within the online merchant's order system and wishes to effect payment using the SSP option they will need to register if they have not already done so. The user is re-directed to the registration screens associated with the trusted intermediary system 10 and then re-directed back to the online merchant's system Register via an online bank—assuming the trusted intermediary system 10 comprises the necessary integration functionality, the user can register for the SSP service from within their bank's online account service.

User Authentication Components

Authentication of a user into the trusted intermediary system 10 for payment transactions can be performed according to any one of the 3 known categories listed below:

1-factor authentication—Something the user knows (e.g., a username and password, pass phrase, or personal identification number (PIN))

2-factor authentication—As 1 factor authentication, plus, something the user has (e.g., ID card, security token, software token, phone, or cell phone)

3-factor authentication—As 2 factor authentication, plus, something the user is or does (e.g., fingerprint or retinal pattern, DNA sequence (there are assorted definitions of what is sufficient), signature or voice recognition, unique bio-electric signals, or another biometric identifier)

In one embodiment the trusted intermediary system 10 implements the authentication process. Alternatively the user can login via their online banking details, in which case the user would log into their online banking account, whereupon the banking system software would re-direct the user back to the trusted intermediary system 10. As a further alternative, authentication could involve an account identifying entity, which, based on user-specific input, could act as an intermediary and cooperate with the trusted intermediary system 10 to effect identification of the user's account on behalf of the user.

Online Merchant Data Store:

The trusted intermediary system 10 stores online merchant profile and registration data. These data include an online merchant internet account identifier together with a transactional and network identifier of the merchant IPSP system 3c with which the online merchant system is registered. These data are held to enable the trusted intermediary system 10 to communicate with the merchant IPSP system 3c on behalf of the online merchant system, and are collectively referred to as merchant IPSP system transmission data, or simply transmission data. In addition the trusted intermediary system 10 comprises a payment authorization service through which the trusted intermediary system 10 effects payments on behalf of the online merchant. Further, because the trusted intermediary system 10 integrates with many merchant IPSP systems it comprises a plurality of interface formats and protocols. Details of the relevant formats and protocols for each merchant IPSP system are held in the online merchant data store. Thus the afore-mentioned transmission data comprises a mapping of a payment authorization request emanating from a given online merchant system to an IPSP identifier, a network address and/or network protocols that enable payment authorization requests to be routed to the relevant merchant IPSP system.

It will therefore be appreciated that registration of any given merchant offering the SSP service involves the merchant specifying the merchant IPSP system to which they subscribe. Conveniently the trusted intermediary 10 can hold a set of records corresponding to active merchant IPSP systems: each set of records can comprise network identifier and required communications protocols for storage in the database DB1 by the trusted intermediary 10. Thus during registration with the SSP the given online merchant can select, e.g. via a drop down list coordinated by the presentation components 404 of the trusted intermediary 10, the merchant IPSP system to which the online merchant has subscribed; the corresponding transmission data (or a link thereto) can then be stored in conjunction with the merchant records held in the database DB1. Accordingly, provided the given online merchant has specified its corresponding merchant IPSP system in the manner just described, then in response to receipt of a payment authorization request from the merchant system, the trusted intermediary 10 can perform a suitable lookup from the database and retrieve the network identifier, protocol requirements etc. of the corresponding merchant IPSP system.

Application Programming Interface (API) Services Adaptor

The trusted intermediary system 10 comprises an API Services Adaptor, which enables connectivity between the trusted intermediary system 10 and the messaging infrastructure of the payment system 1. The adaptor is configured to manage the fulfillment of the trusted intermediary system 10 requests to external services, such as payment authorizations to merchant IPSP system 3c and to expose a set of the trusted intermediary system 10 services that could be used by external functions such as merchant IPSP system 3c.

Transaction-Specific Components and Data:

The trusted intermediary system 10 stores transactional data such as payment authorizations and settlements that are managed by the trusted intermediary system 10. In addition the trusted intermediary system 10 can store audit data associated with users and online merchant online activity as well as general system activity.

Messaging Services

The trusted intermediary system 10 is configured with email agents, which compose and transmit emails for the purposes of email address authentication and user activation and purchase order confirmations.

As mentioned above the trusted intermediary system 10 is preferably embodied as a web application server, for example as a J2EE compliant application server 401 which manages and provides access to the common business logic of the platform, and a web server & J2EE servlet engine 403, which acts as the entry point for external HTTP requests to the trusted intermediary system 10 from online merchants and from users' browsers.

The web server and servlet engine 403 comprises presentation components, which expose web services-based payment APIs or API wrappers to online merchant systems. In addition, the web server and servlet engine 403 comprises presentation processing components 404 which are configured to generate and manage the interface to the user, e.g. when the user selects a payment method in the manner described above.

The J2EE Application Server 401 manages all the business logic for the web platform and applications. The business logic comprises functional software components 411a . . .

411*e*, which can be implemented as, for example, Session EJBs (Enterprise Java Beans). These functional groups include, e.g. email processing modules, address validation modules, and fraud and security service modules; in addition the server 401 comprises objects implemented, for example, as EJB 3.0 specified Java objects 411*f* . . . 411*h* that provide access to static and persistent data stored in DB1 such as user data, audit data and transaction data described above. The trusted intermediary system 10 comprises web services in the form of wrappers that expose the Session EJBs to other elements of the payment system 1. More specifically, the functional software components 411*a* . . . 411*e* and objects 411*f*. . . 411*h* interoperate with external service enablers 405 such as address validation services, email applications (including access to an email server) and fraud services 415*a* . . . 415*d*, among others. The application server 401 components 411*a* . . . 411*h* communicate with the application components 415*a* . . . 415*c* via a set of APIs, referred to generically as such in relation to parts 413*a* . . . 413*d*. When implemented as a web server, data between the elements of the payment system 1 (i.e. those shown in FIGS. 2 and 3) and the trusted intermediary system 10 are transmitted using a secure mechanism, e.g. via the HTTP over Secure Socket Layer protocol (HTTPS).

Figure 5:
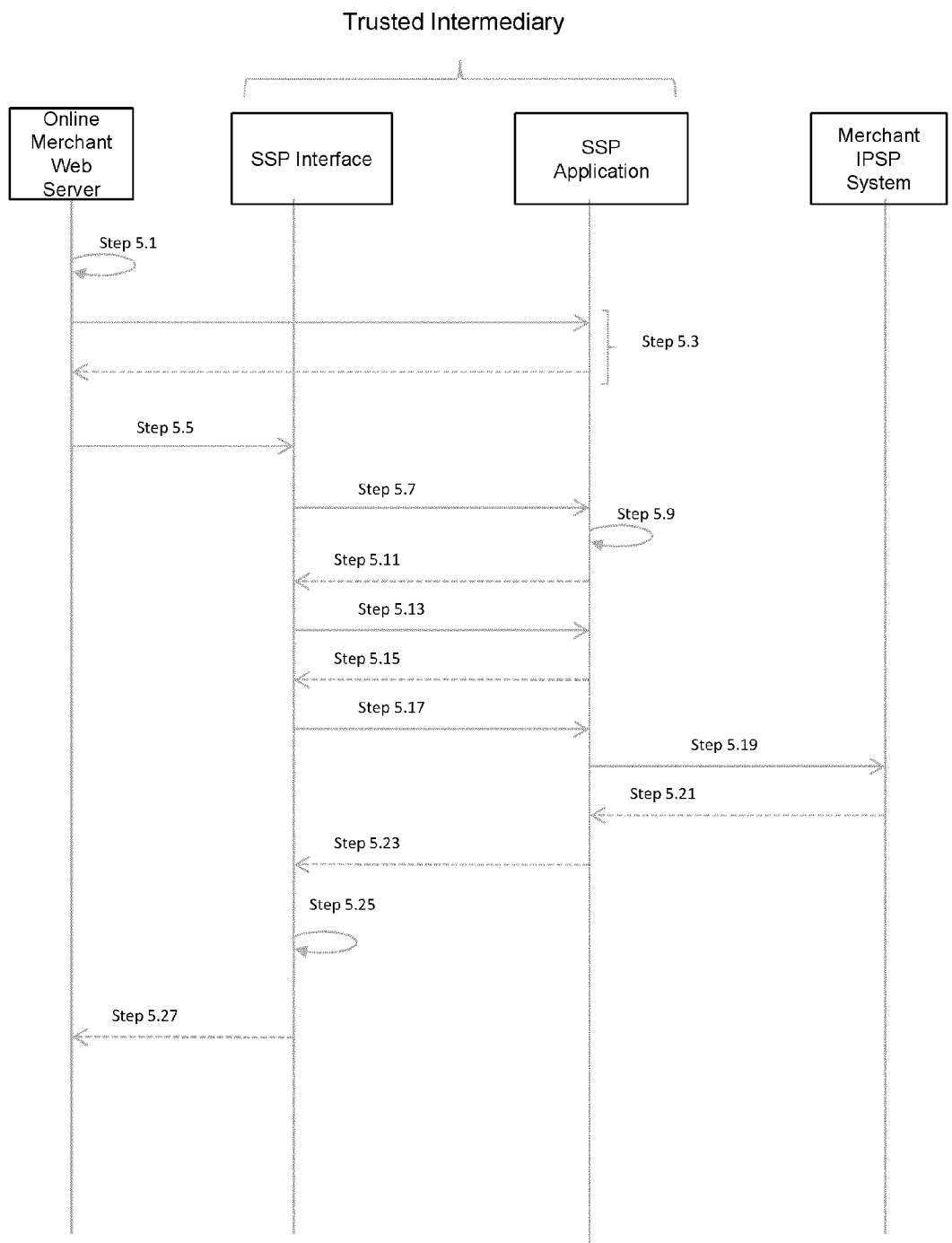
FIG. 5 is a schematic timing diagram showing the flow of messages between selected components of the payment system of FIG. 2 according to an embodiment of the invention.

The processing steps described above with reference to FIG. 3, specifically the steps performed in particular by the trusted intermediary system 10 when interfacing with the various payment entities, will now be described in more detail. Turning to FIG. 5, at step S5.1, the user selects SSP payment service as the payment method and submits their selection to the online merchant website. This triggers a request from the online merchant system, specifically retrieval by the online merchant system of the URL corresponding to a sign-in page of the trusted intermediary system 10, and subsequently the sending of a key order plus online merchant fields including a return URL (step S5.3) and the creation of a secure session. Having received the sign-in URL from the trusted intermediary system 10, the online merchant system displays the sign-in page to the user (step S5.5). In one arrangement the sign-in page is implemented as an iFrame, which enables the user to communicate directly with the trusted intermediary system 10 while remaining within the online merchant's online environment. The user enters their sign-in details (step S5.7), and is authenticated according to one of the authentication mechanisms described above (step S5.9); if authentication is successful, the web server and servlet engine 403 sends data content from the user's remote store to the iFrame for display and selection therein (step S5.11). Once the user has selected their payment method from the options within the downloaded remote store contents, the user submits their selected option (step S5.13) to the web server and servlet engine 403, resulting in a confirmation page being transmitted to the iFrame (step S5.15).

Once the user has confirmed the payment selection and submitted same (step S5.17), the web server and servlet engine 403 sends the payment details to the online merchant's IPSP system 3*c* (step S5.19) via a payment authorisation service through which the trusted intermediary system 10 effects payments on behalf of the online merchant; this involves creating an authorization request for receipt by the payment APIs 406, converting the payment authorization request into the API format of the online merchant's API and transmitting the formatted request to the merchant IPSP system 3*c*. A settlement request is also transmitted to the payment APIs 406, which performs conversion of the settlement request into the API format of the online merchant's API and transmits same to the merchant IPSP system 3*c*. It will be appreciated that the communication may be effected by either single or dual message implementations. These formatting and transmission actions are recorded in the transaction data store held by the trusted intermediary system 10 corresponding to the online merchant system.

Upon notification of authorization of the payment request (step S5.21), the web server and servlet engine 403 transmits a return online merchant URL to the iFrame (step S5.23), together with notification of successful authorization, causing the iFrame to empty, reload with JavaScript code from the online merchant system (step S5.25), and thus remove the iFrame and return the user to the online merchant system's website. Finally, the online merchant system's website displays a successful order webpage at step S5.27.

Figure 4:
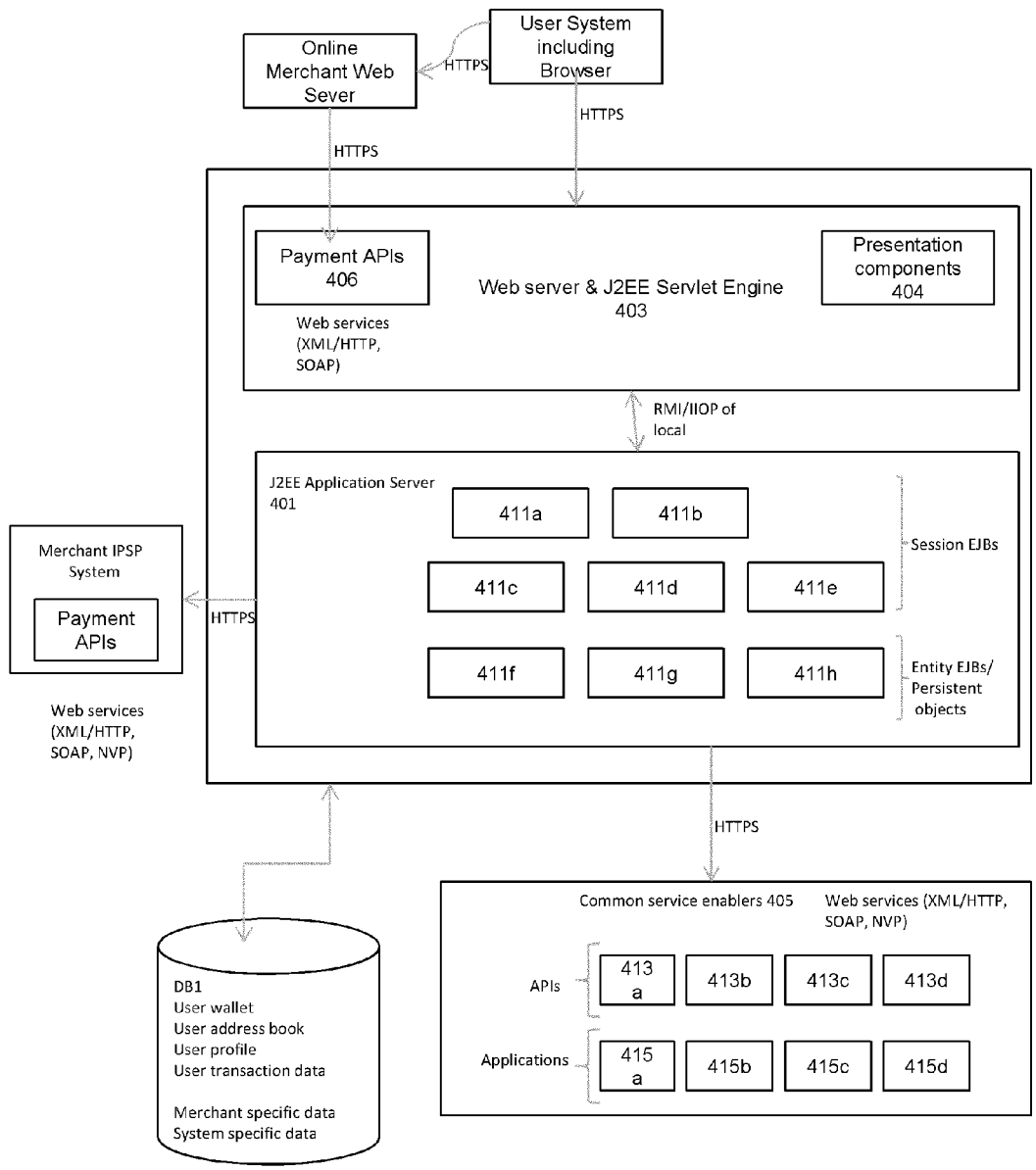
FIG. 4 is a schematic block diagram showing components of the trusted intermediary system of FIG. 2 according to an embodiment of the invention.

In parallel with steps S5.13-S5.19 the application server 401 can log the user's activity and send same to the audit data store, while sending corresponding system and event information to a third party fraud notification system (this is represented by one of the common service enablers 415*a* shown in FIG. 4). The fraud notification system comprises, but is not limited to, a fraud risk engine, which performs analysis of same so as to generate a risk score and a recommended action for the transaction; suitable fraud notification systems such as that provided by RSA™ in their fraud prevention suite are known and will not be described in any more detail herein. The risk score and action are stored in the database DB1, in conjunction with the other transaction details for the online merchant and the user.

The above embodiments are to be understood as illustrative examples of the invention. Further embodiments of the invention are envisaged. For example, while in the foregoing examples the trusted intermediary system 10 is described as receiving payment requests from online merchant systems, the intermediary 10 could additionally or alternatively receive payment requests from a merchant IPSP system in the third type of arrangement described in the background section in cases where such merchant IPSP systems have been modified to offer SSP as a payment option.

Further, while certain embodiments make use of iFrame web technology to navigate the user to different websites, it will be appreciated that standard web redirection can instead be employed. In such alternative arrangements the user's browser will be navigated away from and back to the SSP website, depending on the entity (or rather the URL corresponding thereto) with which the user's browser is communicating at any point in time. For example, during authentication and/or account selection by the user, the user's browser may be redirected by the SSP website to a website provided by, or on behalf of, the user's issuing bank, and once the user authentication and/or account selection is completed, the user's browser may be redirected by the issuer bank website back to the SSP website.

In the foregoing embodiments the trusted intermediary system 10 is described as storing shipping details in the set of user records: to this extent the trusted intermediary system 10 can be viewed as providing part of the functionality associated with a checkout tool: the relevant fields stored in the database DB1 could be available through the interface to enable merchant systems to reference the data during the checkout process and populate fields appropriately. However, it is to be understood that this is an optional aspect of the intermediary 10. Indeed, the checkout functionality could be provided by the online merchant system 1*c*, in which case the trusted intermediary system 10 would simply perform the role of a payment tool, and the database DB1 would then store fewer items of user-specific information.

In the foregoing, the term "system", when applied to entities such as the merchant system, the merchant IPSP system, the trusted intermediary system and other entities, should be understood to mean a data processing function, provided at one or more physical sites, connected to other data processing functions via data communications links. Each function may be provided by a single data processing node, for example a server computer, or a set of data processing nodes providing fail-over backup to each other, such as a cluster of server computers, and/or a set of interconnected data processing nodes providing different modular sub-functions with respect to other members of the set, for example an interworking set of different server computers.

As will be appreciated from the foregoing, communications between the various entities comprising the payment system 1 preferably proceed via a data communications network such as the Internet. Each of the entities of the payment system 1 (the issuing bank; the trusted intermediary; the acquiring bank processor; the merchant IPSP systems; and the online merchant systems) is identifiable via a network identifier such as an Internet Protocol (IP) address or other suitable identifier.

Accordingly the communications network can comprise a network comprising one or more technologies i.e. a hybrid communication network; for example the network can comprise the Internet in conjunction with the Public Switched Telephone Network (PSTN) and/or a mobile communication network capable of supporting, for example, one or more of the following communication protocols: GSM (Global System Mobile), WCDMA (Wideband Code Division Multiple Access), GPRS (General Packet Radio Service). In addition to or instead of the mobile communication network, a local area network such as a Wireless Local area network (WLAN) or BlueTooth® (BT) and/or other technologies such as WiMax can be used to carry part of the payment authorisation request and response messages. In this way, users can interact with the online merchant systems using portable, remote devices. The data communications network can be arranged to support generic Internet access using any transport methods. In addition, or as an alternative, to sending confirmation messages as email messages, payment confirmation messages can be transferred as SMS-messages (Short Message Service), MMS-messages (Multi Media Service), Wireless Application Protocol (WAP) pages, Internet pages, HTML (Hypertext Mark-up Language) pages, XHTML (eXtended HTML) pages, or IP-datagrams (Internet Protocol).

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of processing payment authorisation requests for payment transactions to be conducted via a data communications network on behalf of online merchants, the payment authorisation requests being conducted as a result of orders by financial instrument holders via a plurality of different online merchant systems, each of the online merchants having an online merchant identity, and each of the online merchants being associated with one of a plurality of different acquiring banks, wherein the method is conducted by a trusted central intermediary system which is configured to transmit payment authorisation requests to each of a plurality of different online merchant Internet Payment Service Provider (IPSP) systems, each of the merchant IPSP systems being configured to transmit payment authorisation requests to at least one of a plurality of acquiring bank payment processor systems, each of the plurality of acquiring bank payment processor systems being responsible for processing payment authorisations for at least one of the acquiring banks, and the method comprising:

receiving from a first online merchant system responsible for originating payment authorisation requests for a first online merchant, a payment authorisation request relating to authorisation of a payment transaction, the received payment authorisation request being initiated as a result of a financial instrument holder conducting an order via the first online merchant system;

in response to receiving the request:
  a) generating a payment authorisation request comprising transaction data including:
    i) a financial instrument identity to be used in the payment transaction by the financial instrument holder;
    ii) an online merchant identity, associated with the first online merchant, as the payment transaction beneficiary; and
    iii) one or more transaction details including a payment amount;
  b) retrieving transmission data to enable the transmission of payment authorisation request data to a selected merchant IPSP system associated with the first online merchant; and
  c) on the basis of the retrieved transmission data, transmitting the generated payment authorisation request to the selected merchant IPSP system, wherefrom a further payment authorisation request may be generated and transmitted to an acquiring bank payment processor system responsible for processing payment authorisations for the acquiring bank with which the first online merchant is associated.

2. The method of claim 1, wherein the trusted central intermediary system is configured to receive a payment authorisation response from the selected merchant IPSP system, and in response thereto to transmit a payment authorisation response to the first online merchant system.

3. The method of claim 1, wherein the first online merchant is an online merchant account holder with the acquiring bank with which it is associated.

4. The method of claim 1, wherein the method further comprises receiving an online merchant identity from the first online merchant system, the online merchant identity included in the generated authorisation request being generated on the basis of the received online merchant identity.

5. The method of claim 1, wherein at least some of the plurality of merchant IPSP systems are configured to transmit payment authorisation requests to more than one of the plurality of acquiring bank payment processor systems.

6. The method of claim 1, wherein the method further comprises receiving data indicating a selection, by the financial instrument holder, between a plurality of different financial instruments for use in the payment transaction, and retrieving a financial instrument identity to be used in the generated payment authorisation request on the basis of the indicated selection.

7. The method of claim 1, wherein the trusted central intermediary system provides a registration interface for a financial instrument holder whereby the financial instrument holder can provide a financial instrument identity for registration with the trusted central intermediary system as stored registration data, the method further comprising authenticating a financial instrument holder and, in response thereto, retrieving a registered financial instrument identity to be used in the generated payment authorisation request from the stored registration data.

8. The method of claim 1, wherein the step of retrieving transmission data comprises retrieving a network address for the selected merchant IPSP system, and the step of transmitting the generated payment authorisation request to the selected merchant IPSP system comprises transmitting the generated payment authorisation request on the basis of the retrieved network address.

9. The method of claim 1, wherein the trusted central intermediary system is configured to cooperate with a plurality of issuing authentication systems, each being responsible for conducting authentication for a different issuing bank, the method comprising the step of retrieving a financial instrument identity to be used in the generated payment authorisation request on the basis of the authentication of the instrument holder by a selected one of the plurality of issuing authentication systems.

10. The method of claim 9, comprising transmitting data to the financial instrument holder enabling the financial instrument holder to perform authentication with respect to a selected authentication system, and receiving authentication response data from the selected authentication system in response to authentication of the financial instrument holder by the selected issuing authentication system.

11. The method of claim 9, comprising receiving data indicating a financial instrument identity to be used in the generated payment authorisation request from the selected issuing authentication system in response to authentication of the financial instrument holder by the selected issuing authentication system.

12. The method of claim 1, wherein the financial instrument identity comprises a Primary Account Number (PAN) associated with the financial instrument.

13. The method of claim 12, wherein the PAN comprises a credit card number or debit card number.

14. The method of claim 1, wherein the merchant IPSP system provides payment transaction settlement for an online merchant account through which the payment transaction is conducted, on behalf of the first online merchant.

15. The method of claim 1, wherein the merchant IPSP system provides payment transaction history for the first online merchant, the payment transaction history being accessible by the first online merchant via an online merchant interface provided by the merchant IPSP.

16. The method of claim 1, wherein the trusted central intermediary system provides a registration interface for the first online merchant whereby the first online merchant can register an merchant IPSP system with which the first online merchant is associated, and wherein the step of retrieving transmission data to enable the transmission of payment authorisation request data to the selected merchant IPSP system associated with the first online merchant is conducted on the basis of the merchant IPSP system registered by the first online merchant.

17. The method of claim 1, wherein the selected trusted central intermediary system is configured to receive and process payment authorisation requests for payment transactions of a first type originating from the first online merchant system, and in response thereto to transmit a generated payment authorisation request to the selected merchant IPSP system, and wherein the merchant IPSP systems is configured to receive and process payment authorisation requests for payment transactions of a different type originating from the first online merchant system, the payment authorisation requests for payment transactions of a different type not being processed via the central intermediary system.

18. The method of claim 17, wherein the payment authorisation requests for payment transactions of a first type originating from the first online merchant system do not include the financial instrument identity and the payment authorisation requests for payment transactions of the different type originating from the first online merchant system include a financial instrument identity collected by the online merchant system during order processing of payment transactions of the different type.

19. The method of claim 18, wherein the financial instrument identity collected by the online merchant system during order processing of payment transactions of the different type comprises a credit card number or a debit card number.

20. A payment authorisation system for processing payment authorisation requests in respect of payment transactions to be conducted via a data communications network on behalf of online merchants, the payment authorisation requests being conducted as a result of orders by financial instrument holders via a plurality of different online merchant systems, each of the online merchants having an online merchant identity, wherein the payment authorisation system comprises a trusted central intermediary system configured to communicate with a plurality of different online merchant Internet Payment Service Provider (IPSP) systems and with a plurality of the online merchants, the trusted central intermediary system being configured to transmit payment authorisation requests to each of the plurality of different online merchant Internet Payment Service Provider (IPSP) systems, wherein each of the merchant IPSP systems is configured to transmit payment authorisation requests to at least one of a plurality of acquiring bank payment processor systems, each of the plurality of acquiring bank payment processor systems being responsible for processing payment authorisations for at least one of the acquiring banks, wherein, responsive to a payment authorisation request relating to authorisation of a payment transaction from a first online merchant system, the received payment authorisation request being initiated as a result of a financial instrument holder conducting an order via the first online merchant system and the online merchant system being responsible for originating payment authorisation requests for the first online merchant, the trusted intermediary system is configured to:
  a) generate a payment authorisation request comprising transaction data including:
    i) a financial instrument identity to be used in the payment transaction by the financial instrument holder; and
    ii) an online merchant identity, associated with the first online merchant, as the payment transaction beneficiary; and
    iii) one or more transaction details including a payment amount; and
  b) retrieve transmission data to enable the transmission of payment authorisation request data to a selected merchant IPSP system associated with the first online merchant; and
  c) on the basis of the retrieved transmission data, transmit the generated payment authorisation request to the selected merchant IPSP system, wherefrom a further payment authorisation request may be generated and transmitted to an acquiring bank payment processor system responsible for processing payment authorisations for the acquiring bank with which the first online merchant is associated.

* * * * *